Figure 1:
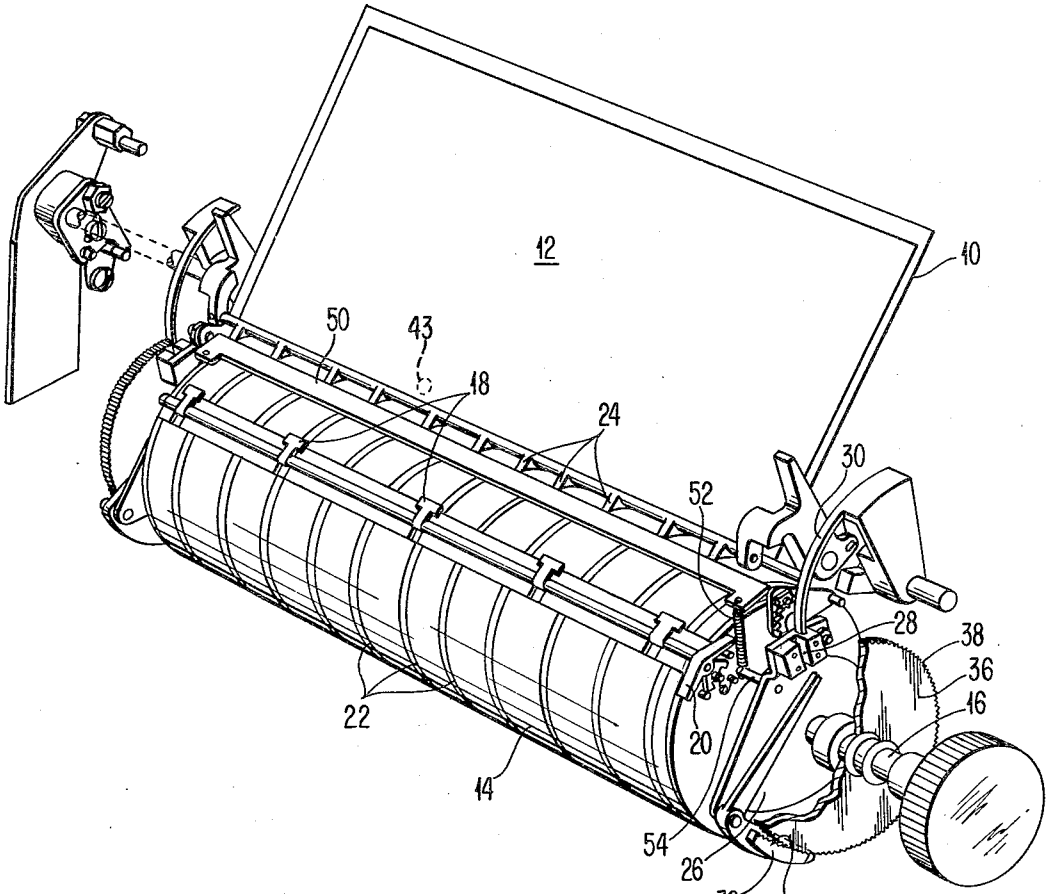
Figure 2:
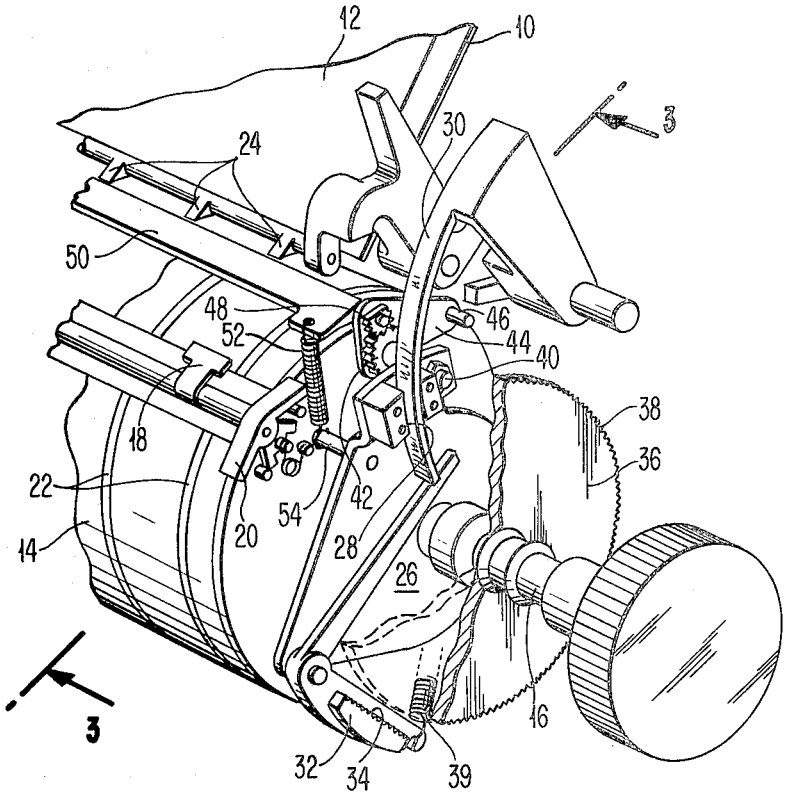
Figure 3:
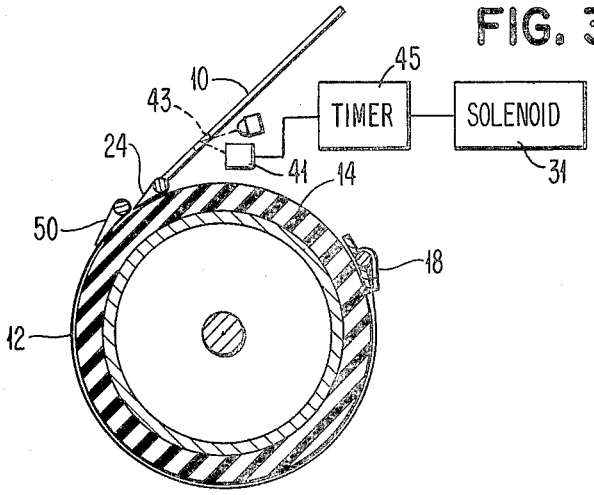

United States Defensive Publication [19] (H) [11] T998,003

Jackson [43] Sep. 2, 1980

[54] APPARATUS FOR CLAMPING SHEETS OF VARIABLE LENGTH ONTO A ROTATING DRUM

[75] Inventor: Donald L. Jackson, Nicholasville, Ky.

[73] Assignee: International Business Machines Corporation, Armonk, N.Y.

[21] Appl. No.: 80,866

[22] Filed: Oct. 1, 1979

Related U.S. Application Data

[63] Continuation of Ser. No. 920,307, Jun. 28, 1978, abandoned.

[51] Int. Cl.[3] ..... B41F 21/04; B41J 13/22; B41J 11/04

[52] U.S. Cl. ..... 101/411; 101/246; 400/527.1; 400/708; 271/82

[57] ABSTRACT

In a printing mechanism, the leading edge of a sheet of paper is fed onto the printing surface of a cylindrical drum and is clamped thereto. A gear is rotatively attached to the drum, and a sensor controlled gear segment clutch, which is mounted for rotation independently of the drum, controls the clamping and rotational movement of a clamp for clamping the trailing edge of the sheet of paper. The sensor senses when the trailing edge of the sheet passes thereby and activates the gear segment clutch which rotates toward the gear attached to the drum and engages it. The rotational movement of the gear segment clutch results in the closing of the trailing edge clamp onto the trailing end of the sheet of paper. The gear attached to the drum rotates the gear segment clutch and it in turn rotates the trailing edge paper clamp which now rotates the drum. Consequently, the above described printing mechanism can clamp both ends of variable length paper onto a cylinder and rotate it for a print operation.

1 Claim, 2 Sheets Drawing,

15 Pages Specification

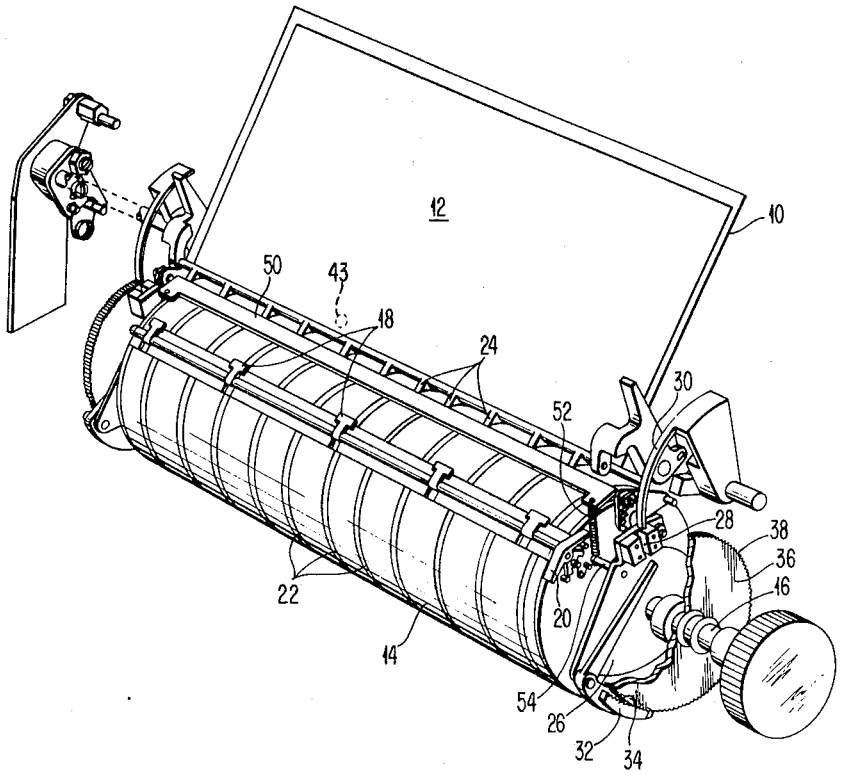

The file of this unexamined application may be inspected and copies thereof may be purchased (849 O.G. 1221, Apr. 9, 1968).